(12) United States Patent
Vittal et al.

(10) Patent No.: US 7,895,016 B2
(45) Date of Patent: Feb. 22, 2011

(54) SYSTEM AND METHOD FOR WIND TURBINE HEALTH MANAGEMENT

(75) Inventors: Sameer Vittal, Greenville, SC (US); Subrat Nanda, New Delhi (IN); Amit Joshi, Bangalore (IN); Donna Green, Eastleigh (GB); Hesham Azzam, Southampton (GB)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/550,988

(22) Filed: Aug. 31, 2009

(65) Prior Publication Data

US 2010/0138267 A1    Jun. 3, 2010

(51) Int. Cl.
*G06F 19/00* (2006.01)
(52) U.S. Cl. .................. 702/184; 702/34; 702/182; 702/187; 702/188; 700/287; 700/286; 700/290; 700/291; 714/22; 714/47; 290/44
(58) Field of Classification Search .................. 702/104, 702/34, 14, 184, 113, 182, 127, 187, 188; 700/287, 286, 290, 291; 714/22, 47
See application file for complete search history.

(56) References Cited

U.S. PATENT DOCUMENTS

| | | | |
|---|---|---|---|
| 6,925,385 B2 * | 8/2005 | Ghosh et al. .................. 702/14 |
| 7,013,203 B2 * | 3/2006 | Moore et al. ................. 700/286 |
| 7,027,953 B2 | 4/2006 | Klein |
| 7,099,800 B2 * | 8/2006 | Henriksen et al. ........... 702/187 |
| 7,127,373 B2 | 10/2006 | House et al. |
| 7,308,614 B2 | 12/2007 | Kojori |
| 7,322,794 B2 * | 1/2008 | LeMieux et al. .............. 416/40 |
| 7,395,188 B1 | 7/2008 | Goebel et al. |
| 7,571,057 B2 | 8/2009 | D'Amato et al. |
| 2004/0230377 A1 * | 11/2004 | Ghosh et al. .................... 702/3 |
| 2005/0090937 A1 * | 4/2005 | Moore et al. ................. 700/286 |
| 2005/0107989 A1 * | 5/2005 | Henriksen et al. ........... 702/188 |
| 2008/0086281 A1 * | 4/2008 | Santos ........................ 702/127 |
| 2008/0140349 A1 | 6/2008 | Behera et al. |
| 2009/0055106 A1 | 2/2009 | Finkel et al. |
| 2009/0204266 A1 * | 8/2009 | Lovmand et al. ............ 700/287 |
| 2009/0254224 A1 * | 10/2009 | Rasmussen ................. 700/287 |
| 2010/0138182 A1 * | 6/2010 | Jammu et al. ................ 702/113 |
| 2010/0148507 A1 * | 6/2010 | Lim et al. ...................... 290/44 |

* cited by examiner

*Primary Examiner*—Carol S Tsai
(74) *Attorney, Agent, or Firm*—James McGinness, Esq.; Armstrong Teasdale LLP

(57) ABSTRACT

A controller for use in managing an operational lifetime of at least one wind turbine is communicatively coupled to at least one wind turbine and a server sub-system. The controller is configured to receive operational data from the wind turbine, transmit the operational data to the server sub-system, and transmit a request for historical data corresponding to the wind turbine to the server sub-system. The controller is further configured to receive a response from the server sub-system, wherein the response includes historical data corresponding to the wind turbine, and to determine an estimate of a time failure of the wind turbine based on at least one of the operational data and the historical data.

20 Claims, 7 Drawing Sheets

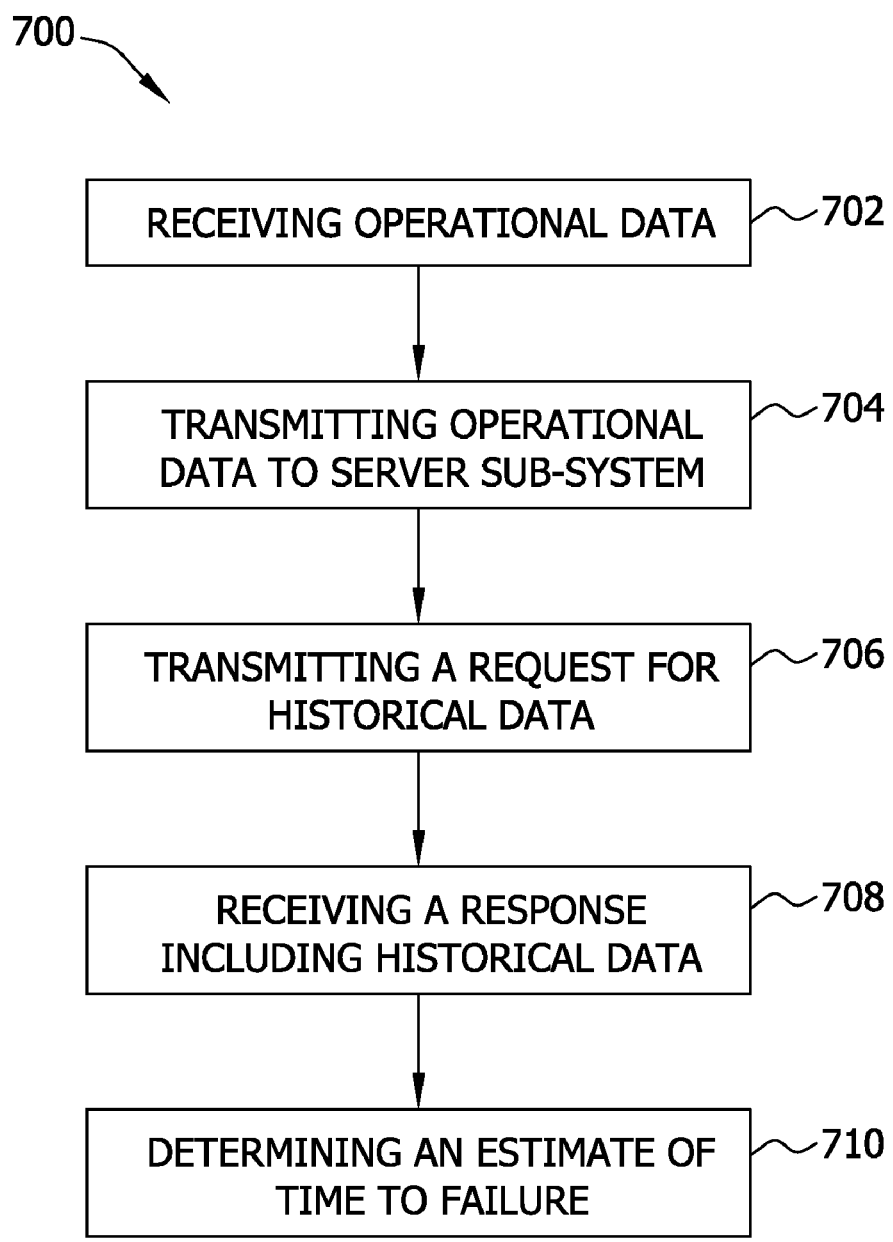

SYSTEM AND METHOD FOR WIND TURBINE HEALTH MANAGEMENT

BACKGROUND OF THE INVENTION

The field of the invention relates generally to wind turbines and, more specifically, to managing the operational lifetime of wind turbine generators.

Wind turbine generators use wind energy to generate electricity and are becoming increasingly more important in terms of a renewable source of generating electricity.

A wind turbine typically includes a device, such as a controller, that monitors various operational parameters of the wind turbine. The controller may adjust various operating parameters, such as a direction to which the wind turbine is facing and/or a pitch angle of the rotor blades. Further, the controller may determine a generator load to place on the wind turbine to efficiently generate electricity within the physical constraints of the wind turbine components. These stresses and loads imposed upon the wind turbine may cause the wind turbine to fail or malfunction, which may prevent the wind turbine from generating electricity. This failure or malfunction can cause a loss of revenue for the operator of the wind turbine until the wind turbine is repaired or replaced.

Generally, wind turbine monitoring systems are reactive in that the systems monitor the wind turbine's various operational parameters for anomalies and/or fault triggers indicating a failure or malfunction in the wind turbine which mandates repair or replacement immediately. Other monitoring systems may monitor wind turbines for substantial increases or decreases in operational parameters such as vibration, temperature, mechanical stress, and generating output. These operational parameters may indicate that the wind turbine is approaching a failure or malfunction at some unknown time in the near future. Such failure or malfunction may require repair or replacement, but may also indicate that the operating parameters of the wind turbine should be adjusted to enable the wind turbine to continue operating. Repairing or replacing a wind turbine before it must be replaced can unnecessarily increase the operating cost of a wind turbine generating facility. An operator that can determine a more accurate time estimate of the failure of a wind turbine could replace the wind turbine closer to the end of the wind turbine's operational lifetime as to avoid such premature repairs or replacements. Further, such an operator could reduce the potential losses of revenue from a loss of generating capacity by an unexpected failure or malfunction of a wind turbine.

BRIEF DESCRIPTION OF THE INVENTION

In one aspect, a controller for use in managing an operational lifetime of at least one wind turbine is provided. The controller is communicatively coupled to the wind turbine and a server sub-system. The controller is configured to receive operational data from the wind turbine, transmit the operational data to the server sub-system, and transmit a request for historical data corresponding to the wind turbine to the server sub-system. The controller is further configured to receive a response from the server sub-system, wherein the response includes historical data corresponding to the wind turbine, and to determine an estimate of a time to failure of the wind turbine based on the operational data and the historical data.

In another aspect, a system for use in managing an operational lifetime of at least one wind turbine is provided. The system includes a controller communicatively coupled to the wind turbine via a communications interface. The controller is configured to determine an estimate of a time to failure of the wind turbine based on operational data and/or historical data corresponding to the wind turbine. The system further includes a server sub-system communicatively coupled to the controller. The server sub-system is configured to receive the operational data from the controller corresponding to the wind turbine, receive a request for the historical data corresponding to the wind turbine from the controller, and transmit a response to the controller. The response includes the historical data corresponding to the wind turbine.

In yet another aspect, a method is provided for managing an operational lifetime of at least one wind turbine using a controller. The controller is communicatively coupled to the wind turbine. The method includes receiving operational data at the controller from the wind turbine, transmitting the operational data to a server sub-system, and transmitting a request for historical data corresponding to the wind turbine to the server sub-system. The method further includes receiving a response at the controller from the server sub-system. The response includes historical data corresponding to the wind turbine, and determining an estimate of a time to failure of the wind turbine based on the operational data and/or the historical data.

BRIEF DESCRIPTION OF THE DRAWINGS

FIG. 7 is a flowchart of an exemplary method for managing an operational lifetime of a wind turbine generator.

DETAILED DESCRIPTION OF THE INVENTION

Figure 1:
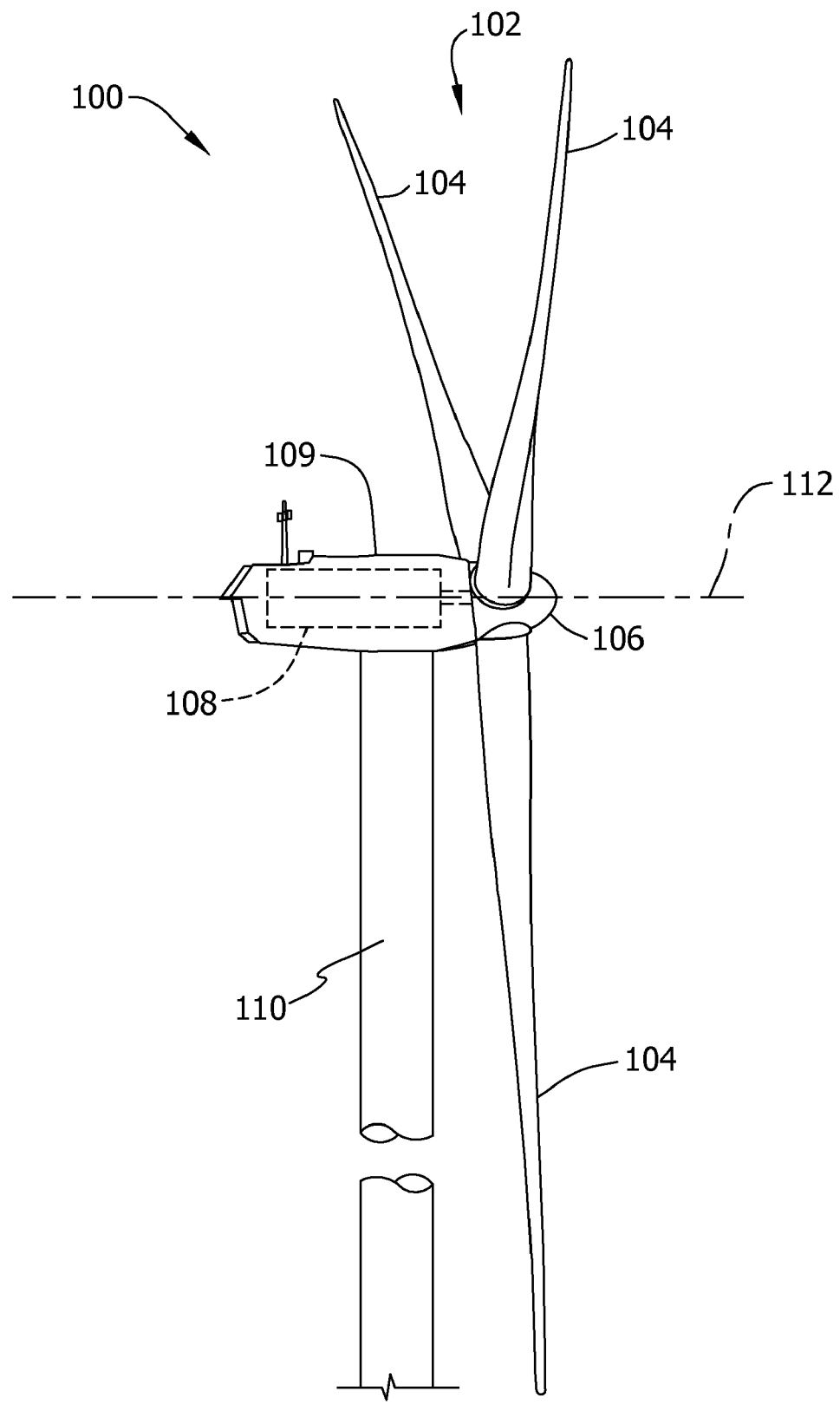
FIG. 1 is a side perspective view of an exemplary wind turbine generator.

FIG. 1 is a schematic diagram illustrating an exemplary wind turbine generator 100. In the exemplary embodiment, wind turbine generator 100 is a horizontal axis wind turbine generator. In an alternative embodiment, wind turbine generator 100 may be a vertical axis wind turbine generator. Wind turbine generator 100 includes a rotor 102 that includes a plurality of rotor blades 104 coupled to a rotatable hub 106. Hub 106 is coupled to a generator 108 that is enclosed within a nacelle 109. In the exemplary embodiment, rotor 102 includes three rotor blades 104. In an alternative embodiment, rotor 102 includes any suitable number of rotor blades 104 known to those skilled in the art and guided by the teachings herein provided for performing the functions as described herein. In the exemplary embodiment, nacelle 109 is coupled to a support tower 110 that supports wind turbine generator 100 during operation. As used herein, the terms "wind turbine" and "wind turbine generator" are used interchangeably.

In the exemplary embodiment, wind forces act upon rotor blades 104 causing rotor 102 to rotate about an axis 112 of generator 108 of wind turbine generator 100 and to generate electrical power. In the exemplary embodiment, the stresses created by the force of the wind upon rotor blades 104, hub 106, generator portion 108, nacelle 109, and support tower 110 are measured by sensors 212 (shown schematically in FIG. 2) and the resulting measurements are transmitted to a controller 204 (shown schematically in FIG. 2). In one embodiment, controller 204 can adjust operational parameters of wind turbine generator 100, such as a pitch angle of rotor blades 104 which decreases or increases a pressure induced upon rotor blades 104 by the wind and similarly decreases or increases a torque applied by hub 106 upon generator 108 of wind turbine generator 100. In an alternative embodiment, controller 204 can adjust a generation load 226 (shown schematically in FIG. 2) coupled to wind turbine generator 100 reducing the torque required to operate generator 108 of wind turbine generator 100. In the exemplary embodiment, controller 204 can adjust the direction towards which rotors 102 face. In certain embodiments, sensors 212 measure multiple operating parameters including, without limitation, component temperatures, generator power output, and/or torque.

Figure 2:
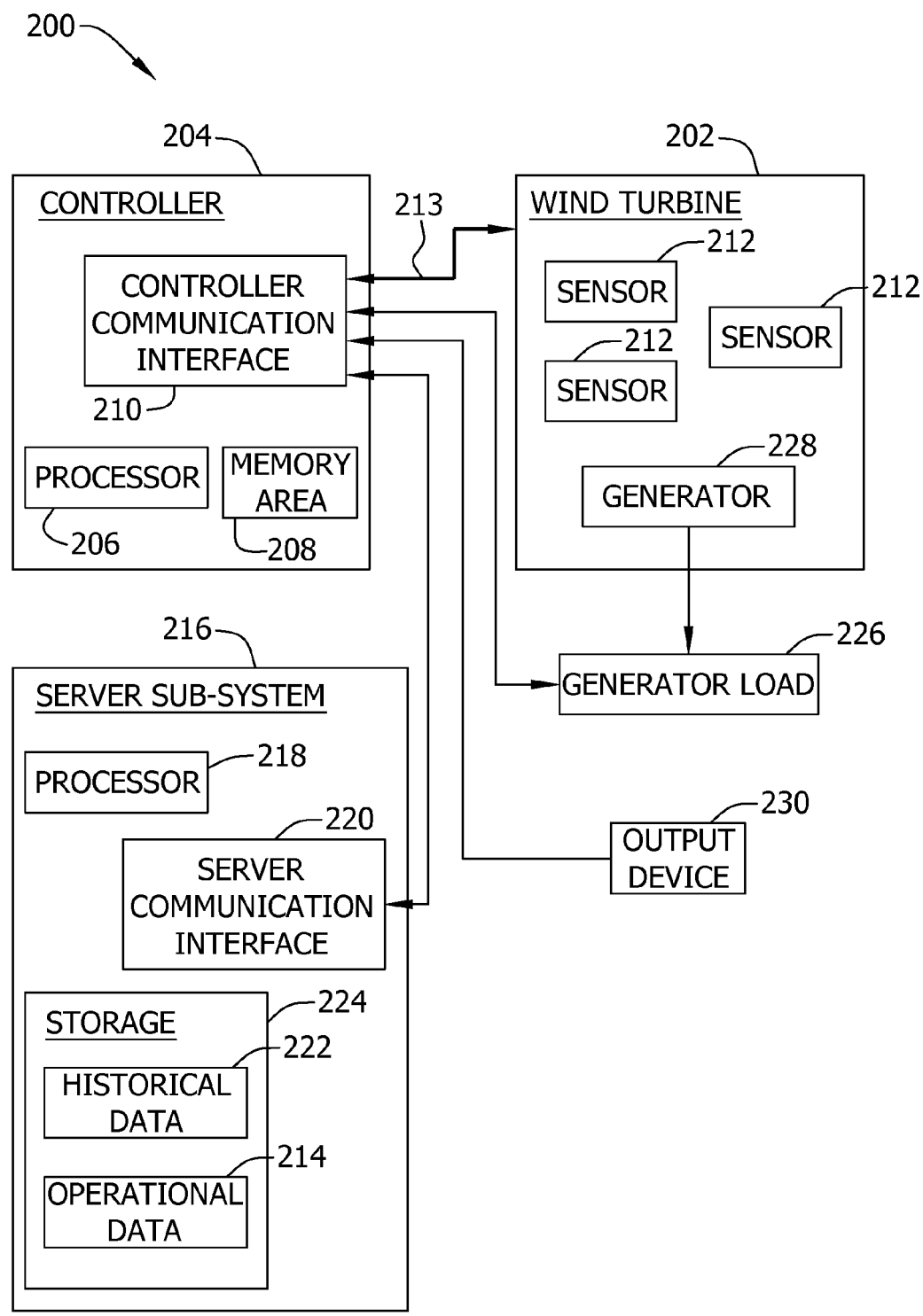
FIG. 2 is a block diagram illustrating an exemplary system for use in managing an operational lifetime of a wind turbine generator.

FIG. 2 is a block diagram illustrating an exemplary system 200 for use in managing an operational lifetime of a wind turbine generator 202. In the exemplary embodiment, system 200 includes a controller 204 that includes a processor 206, a memory area 208, and a controller communications interface 210 that couples controller 204 to wind turbine generator 202. In the exemplary embodiment, a sensor 212 measures one or more operating parameters of wind turbine 202 and transmits one or more signals 213, corresponding to the measurement, to controller 204. In such an embodiment, operational data 214 can include fault conditions indicating that the measurement by sensor 212 is outside of a predetermined range. In the exemplary embodiment, wind turbine 202 includes multiple sensors 212 each used to measure various operating parameters, such as mechanical stress and temperature, of corresponding components of wind turbine 202. Further, in the exemplary embodiment, controller 204 is communicatively coupled to a server sub-system 216 via controller communication interface 210 and a server communication interface 220 for use in storing and retrieving operational data 214 and/or historical data 222 stored on a storage medium 224 located in server sub-system 216. In an alternative embodiment, storage medium 224 is separate and apart from server sub-system 216 and is communicatively coupled to server sub-system 216 via server communication interface 220. In the exemplary embodiment, server sub-system 216 receives operational data 214 from controller 204 corresponding to wind turbine 202. Further, in the exemplary embodiment, server sub-system 216 receives a request from controller 204 for historical data 222 corresponding to wind turbine 202, a processor 218 determines a response, and server sub-system 216 transmits the response, including historical data 222 corresponding to wind turbine 202, to controller 204. In one embodiment, server sub-system 216 stores received operational data 214 on storage medium 224. In a further embodiment, server sub-system 216 includes stored operational data 214 with historical data 222 when responding to subsequent requests for historical data 222.

In the exemplary embodiment, controller 204 receives operational data 214 from sensors 212 and historical data 222 from server sub-system 216, both corresponding to wind turbine 202, and controller 204 determines an estimate of a time to failure of wind turbine 202. In the exemplary embodiment, historical data 222 includes patterns of operational parameters of wind turbine 202 that historically have resulted in associated faults and failures of components of wind turbine 202. In such an embodiment, historical data 222 can also include historical data from predetermined interchangeable wind turbine generator components, such as interchangeable replacement generators 228 of varying generating capacities and interchangeable replacement rotor blades 104 of varying sizes. Such interchangeable components may exhibit similar fault and/or failure patterns as wind turbine 202 and incorporating these patterns into historical data 222 may improve accuracy of controller's 204 determination of an estimate of the time to failure of wind turbine 202. Further, in the exemplary embodiment, controller 204 calculates a first failure probability based on at least one physics-based maintenance factor (shown in FIG. 3). In such an embodiment, controller 204 also may calculate a second failure probability based on at least one empirical maintenance factor (shown in FIG. 4), as well as calculate a third failure probability based on at least one event-based maintenance factor (shown in FIG. 5). In such an exemplary embodiment, controller 204 combines two or more of the first, second, and/or third failure probabilities using data fusion equations based on a Dempster-Schafer evidence theory, Bayesian data fusion, and/or fuzzy logic to determine the estimated time to failure of wind turbine 202. Each of the first, second, and third failure probabilities provide a certain level of accuracy that can be improved upon by combining two or more of the individual failure probabilities. Determining the time to failure of wind turbine 202 enables an operator of wind turbine 202 to plan for repair and/or replacement of wind turbine 202 or components of wind turbine 202, as opposed to merely reacting to an alarm from sensor 212 indicating a present fault or failure of wind turbine 202 requiring urgent repairs and/or replacement. Generally, a scheduled repair or replacement can be completed more quickly as compared to an unscheduled repair or replacement, yielding a shorter down-time for wind turbine 202, resulting in more time spent by wind turbine 202 generating electrical power for use or sale by the operator of wind turbine 202.

Further, in one embodiment, upon determining that the time to failure of wind turbine 202 is nearing, system 200 can reduce a generator load 226 coupled to generator 228 of wind turbine 202 to reduce overall stress and load on components of wind turbine 202 and extend the operational lifetime of the corresponding wind turbine 202. In an alternative embodiment, system 200 increases generator load 226 coupled to wind turbine 202 by a load amount large enough to offset the reduced generator load 226 coupled to a different wind turbine 202. In yet another embodiment, system 200 increases each generator load 226 that is coupled to multiple wind turbines 202 each by a portion of the reduced generator load 226 whereby the sum of all the increases is large enough to offset the reduced generator load 226 coupled to a different wind turbine 202 nearing its time to failure. Further, in one embodiment, system 200, including controller 204 and server sub-system 216, is coupled to at least one output device 230 for use in outputting the time to failure determinations, operational data 214, and historical data 222. Such output device 230, in certain embodiments, may include a display module (not shown) to display the output in human readable form, and/or an interface module (not shown) to interface the output with other devices or systems.

Figure 3:
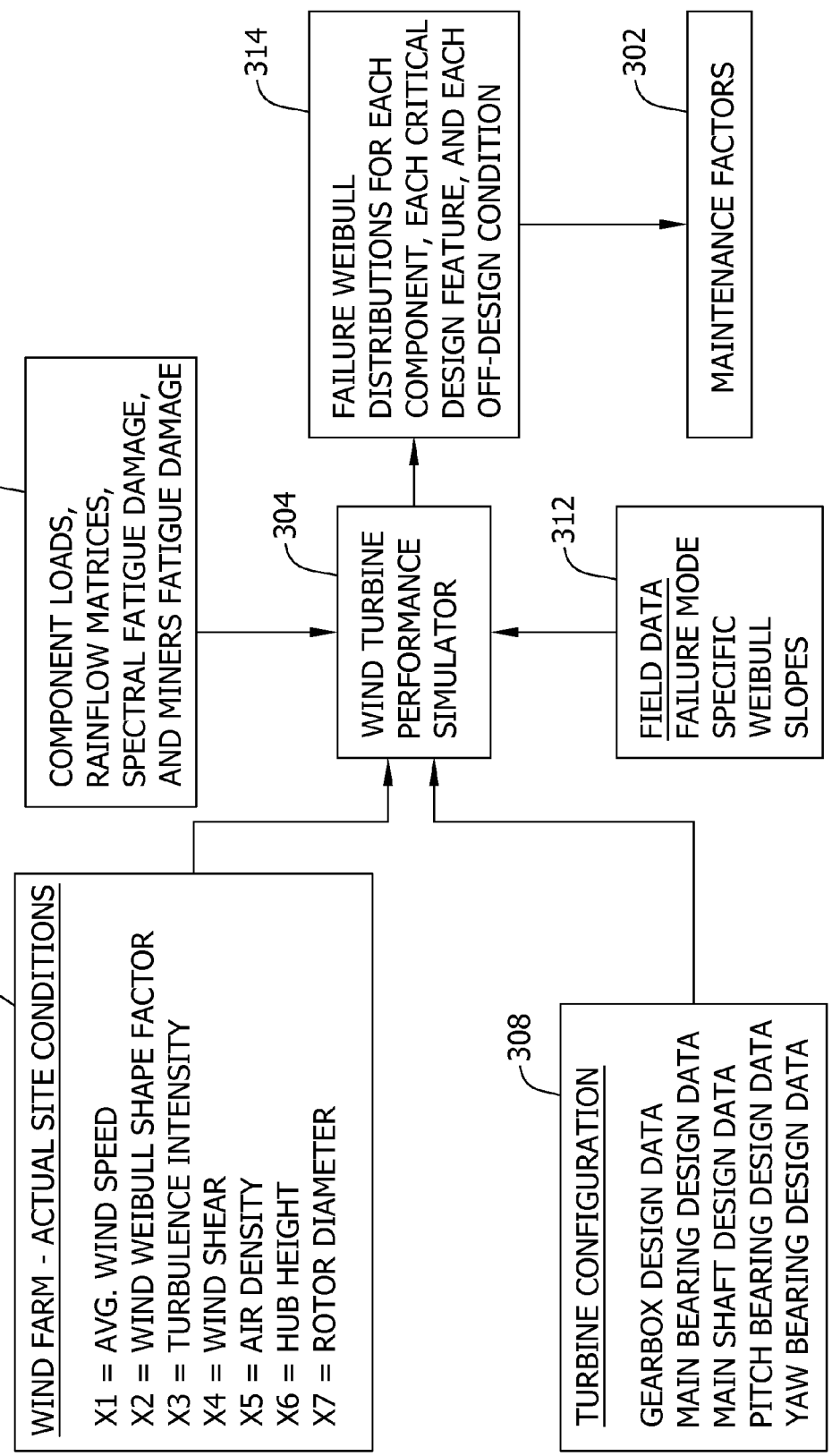
FIG. 3 is a block diagram illustrating an exemplary sub-system for calculating physics-based maintenance factors for use in determining an operational lifetime of a wind turbine generator.

FIG. 3 is a block diagram illustrating an exemplary subsystem 300 for calculating at least one physics-based maintenance factor 302 for use by a controller, such as controller 204 shown in FIG. 2, to determine an operational lifetime of a wind turbine, such as wind turbine 100 shown in FIG. 1 or wind turbine 202 shown in FIG. 2. In an exemplary embodiment, a wind turbine performance simulator 304 uses at least one actual site condition 306 of a wind farm and at least one type of turbine configuration design data 308 to simulate the performance of the wind turbine 202. Simulator 304 may include known wind turbine simulation systems and models, and can be based on simulation systems and/or models known as FLEX5 or wind turbine models developed by a wind turbine manufacturer using a system known as ADAMS. In one embodiment, simulator 304 uses measured and/or modeled input parameters 310 that may include component loads, rain flow matrices, spectral fatigue damage, and Miners fatigue damage, or any combination thereof. In another embodiment, the measured and/or modeled input parameters 310 include parameters specific to wind turbine 202 being simulated as provided by the manufacturer or designer of wind turbine 202. In the exemplary embodiment, simulator 304 further uses historical field data 312 that includes specific Weibull slopes for one or more failure modes, to determine at least one failure Weibull distribution 314 for each component, each critical design feature, and each off-design condition of wind turbine 202. In the exemplary embodiment, historical field data 312 may include field failure data obtained during past warranty repairs, field services and related databases specific to the wind turbine 202 being simulated, along with operating data for both failed and working wind turbine 202 units. In one embodiment, failure Weibull distribution 314 slopes are provided by the manufacturer of wind turbine 202. In another embodiment, an operator of wind turbine 202 is able to generate failure Weibull distribution 314 slopes based on a length of operation and the quantity of wind turbines 202 operated by the operator.

In the exemplary embodiment, controller 204 (shown in FIG. 2) calculates at least one physics-based maintenance factor (MF) 302 using:

$$MF = K \cdot \exp\left[a_0 + \sum_{i=1}^{i=7} a_i X_i + \sum_{i=1,j=1}^{i=7,j=7} a_{ij} X_i X_j\right] \quad \text{Eq. (1)}$$

wherein i and j are a range from 1 to a quantity of actual site conditions 306 used for the calculation, $a_0$, $a_i$ and $a_{ij}$ are maintenance factor coefficients, $X_i$ and $X_j$ are the measured actual site conditions 306, and K is a Bayesian calibration factor. Moreover, in the exemplary embodiment, the Bayesian calibration factor is calculated using a known Monte-Carlo sampling algorithm. In an alternative embodiment, the Bayesian calibration factor can be estimated based on calculated physics-based maintenance factors (MF) 302, failure Weibull distributions 324 provided by the manufacturer of wind turbine 202, and measured site conditions 306 from wind turbine 202. In the exemplary embodiment, the physics-based failure probability $F_1(t)$ is calculated, using the calculated values for MF 302 using:

$$F_1(t) = 1 - \exp\left[-\left(\frac{MF \cdot t}{\eta_{design}}\right)^\beta\right] \quad \text{Eq. (2)}$$

wherein $\beta$ (beta) is a life exponent from physics & field data, and $\eta_{design}$ (eta) is a physics-based life term. In the exemplary embodiment, the life exponent parameter $\beta$ (beta) and the physics-based life term $\eta_{design}$ (eta) are calculated from detailed reliability-block diagrams developed by the manufacturer of wind turbine 202. In one embodiment, to determine the life exponent parameter $\beta$ (beta) and the physics-based life term $\eta_{design}$ (eta), a theoretical life consumed for a plurality of features of wind turbine 202 is determined, then a standard-life Weibull distribution or accelerated-life Weibull distribution is estimated for each of the features, wherein the determined theoretical life consumed is then used in a Monte-Carlo simulation and/or a closed-form calculation to estimate a physics-based system reliability model, as well as determine an equivalent life distribution that closely fits the system reliability model. In such an embodiment, the resulting system reliability model includes at least the life exponent parameter $\beta$ (beta) and the physics-based life term $\eta_{design}$ (eta) for use in Eq. (2).

In the exemplary embodiment, site conditions 306 may include at least one of an average wind speed, a wind Weibull shape factor, a turbulence intensity, a wind shear, an air density, a hub height, and a rotor diameter as measured by at least one sensor 212 (shown in FIG. 2) of wind turbine 202. Further, in such an embodiment, turbine configuration design data 308 includes design data from at least one of a gearbox, a main bearing, a main shaft, a pitch bearing, and a yaw bearing. In the exemplary embodiment, data 308 and physics-based life term $\eta_{design}$ (eta) may be provided by the manufacturer of wind turbine or obtained by other means by one with ordinary skill in the art.

Figure 4:
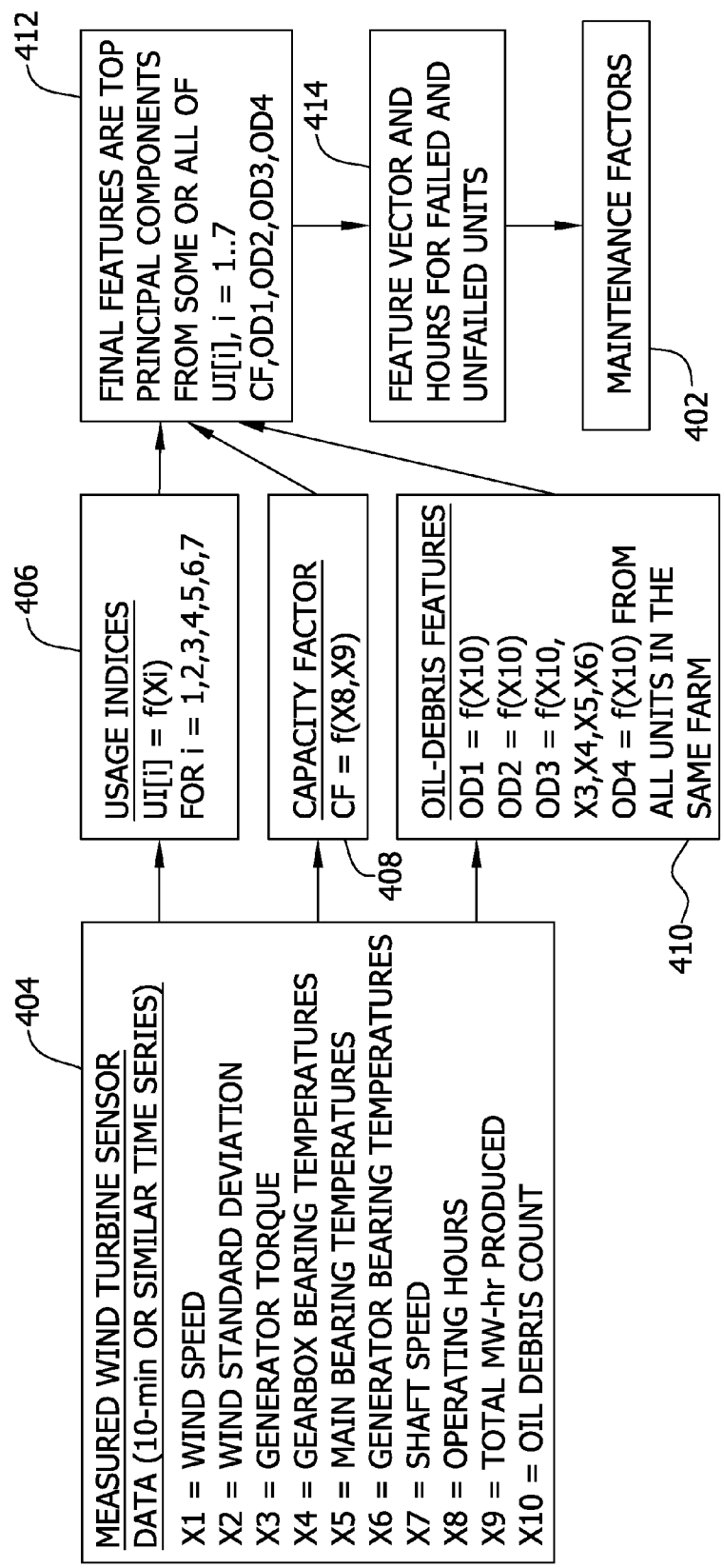
FIG. 4 is a block diagram illustrating an exemplary sub-system for calculating empirical-based maintenance factors for use in determining an operational lifetime of a wind turbine generator.

FIG. 4 is a block diagram illustrating an exemplary subsystem 400 for calculating at least one empirical-based maintenance factor 402 for use by a controller, such as controller 204 shown in FIG. 2, to determine an operational lifetime of a wind turbine, such as wind turbine 100 shown in FIG. 1 or wind turbine 202 shown in FIG. 2. In an exemplary embodiment, measured data 404 from at least one wind turbine sensor 212 (shown in FIG. 2) is used by controller 204 to calculate at least one usage index 406, a capacity factor 408, and at least one oil debris feature 410. Moreover, in the exemplary embodiment, the at least one usage index 406 is determined from operational parameters using compression algorithms and includes operational lifetime information representative of the measured operational parameters.

In the exemplary embodiment, usage index 406 is calculated using algorithms that reduce large quantities of operational data 214 and historical data 222 into a smaller set of numerical values, or usage indices 406, that contain information regarding life consumed and the rate at which components of wind turbine 204 are used. Moreover, in the exemplary embodiment, each usage index 406 is typically extracted for historical data 222 and/or operational parameters received from each sensor 212, and has mathematical properties that enable usage index 406 from historical data 222 and/or operational data 214 received from one sensor 212 to be used in mathematical expressions in combination with usage index 406 from historical data 222 and/or operational data 214 received from other sensors 212.

In the exemplary embodiment, to determine usage index 406, a large quantity of historical data 222 and/or operational data 214 that is obtained from one or more sensors 212 is analyzed to ensure the values are within feasible ranges, and any out-of-range values are replaced using known statistical imputation techniques. Moreover, in the exemplary embodiment, a series of known statistical operations are performed on the resulting historical data 222 and/or operational data 214, and various statistical features, figures-of-merit, and summaries related to damage-causing major and minor cycles are determined and fit to specific mathematical functions and/or multivariate distributions described herein. Further, in the exemplary embodiment, such statistical features are determined in a manner that provides greater weight to portions of historical data 222 and/or operational data 214 that statistically correlate with a greater propensity to actual damage and usage of components of wind turbine 204. Furthermore, in the exemplary embodiment, a series of mathematical operations are performed on the specific mathematical functions and/or multivariate distributions described herein, to determine usage index 406, which can constantly change with time, depending on received operational data 214, but is usually increasing cumulatively over time.

In one embodiment, controller 204 determines at least one final feature 412 based on one or more of the at least one usage index 406, capacity factor 408, the at least one oil debris feature 410, and historical data 222 (shown in FIG. 2) that includes data 414 from failed and non-failed components of wind turbine 204. In one embodiment, when determining the at least one final feature 412, controller 204 bases the determination upon at least one known statistical measurement such as correlation with failure, probability of detection, and false alarm rate. Moreover, in the exemplary embodiment, the historical data 222 includes patterns of operational parameters of the wind turbine 202 that historically have resulted in associated faults and failures of components of the wind turbine 202. In one embodiment, historical data 222 can also include historical data 222 from predetermined interchangeable wind turbine generator components, such as interchangeable replacement generators of varying generating capacities and interchangeable replacement rotor blades of varying sizes. Such interchangeable components may exhibit similar fault and/or failure patterns as wind turbine 202 and incorporating these patterns into historical data 222 may improve accuracy of controller's 405 determination of an estimate of the time to failure of wind turbine 202.

In one embodiment, controller 204 correlates measured data 404 against historical data 222 to determine if such measured data 404 has indicated a future fault or failure of one or more corresponding components of wind turbine 202. In a further embodiment, controller 204 correlates measured data 404 from multiple sensors 212 against historical data 222 from multiple sensors 212 to determine the operational lifetime of wind turbine 202. Such multiple correlations can increase the accuracy of the determinations.

In the exemplary embodiment, controller 204 then calculates at least one empirical-based maintenance factor 402 using:

$$MF = K \cdot \exp\left[b_0 + \sum_{i=1}^{i=n} b_i X_i + \sum_{i=1, j=1}^{i=n, j=n} b_{ij} X_i X_j\right] \quad \text{Eq. (3)}$$

wherein i and j are a range from 1 to a quantity of measured wind turbine sensor data 404 used for the calculation, $b_0$, $b_i$ and $b_{ij}$ are maintenance factor coefficients 402, $X_i$ and $X_j$ are the measured wind turbine sensor data 404, and K is a Bayesian calibration factor. In one embodiment, the Bayesian calibration factor K is calculated using a known Monte-Carlo sampling algorithm. In a further embodiment, the Bayesian calibration factor can be estimated using a prior distribution of the model parameters and past field failure and/or accelerated-life test data through known methods. In the exemplary embodiment, the empirical-based failure probability $F_2(t)$ is calculated using the calculated values for MF 402 using:

$$F_2(t) = 1 - \exp\left[-\left(\frac{MF \cdot t}{\eta_{field}}\right)^\beta\right] \quad \text{Eq. (4)}$$

wherein β (beta) is a life exponent from empirical & field data, and $\eta_{design}$ (eta) is an empirical-based life term. In one embodiment, the life exponent β (beta) and the empirical-based life term $\eta_{design}$ (eta) are calculated using field data by using known maximum-likelihood techniques. In a further embodiment, the life exponent β (beta) and the empirical-based life term $\eta_{design}$ (eta) can be estimated using a known gradient-search algorithm and/or an evolutionary/genetic algorithm.

In the exemplary embodiment, measured data 404 may include data from sensors 212 (shown in FIG. 2) measuring a wind speed $X_1$, a wind standard deviation $X_2$, a generator torque $X_3$, a gearbox bearing temperature $X_4$, a main bearing temperature $X_5$, a generator bearing temperature $X_6$, a shaft speed $X_7$, operating hours $X_8$, a total quantity of megawatt-hours produced $X_9$, and an oil debris count $X_{10}$. In one embodiment, capacity factor 408 may be determined from measured data 404, specifically from operating hours $X_8$ and total megawatt-hours produced $X_9$. In the exemplary embodiment, capacity factor 408 is calculated using:

$$CapacityFactor = \frac{Annual\_energy\_production}{Power\_rating * 8760} \quad \text{Eq. (5)}$$

where Annual_energy_production is the energy, in Megawatt-hours, produced by wind turbine 202 in one year, Power_rating is the power rating of wind turbine 202, and the constant 8760 is the number of hours per year wind turbine 202 is expected to operate. In the exemplary embodiment, Power_rating is 1.5 Megawatts. In an alternative embodiment, Power_rating is the power rating corresponding to wind turbine 202 and known to those skilled in the art and guided by the teachings herein. Further, in the exemplary embodiment, one or more oil debris features 410 may be determined from measured data 404. More specifically, oil debris particle count $OD_1$ and oil debris rate-of-change $OD_2$ for a specific wind turbine may be determined from oil debris count $X_{10}$ for a specific wind turbine, a Hotelling T-square statistic calculated over the peer group over time $OD_4$ may be determined from oil debris count $X_{10}$ from all units in the same wind farm, and the Hotelling T-square statistic calculated for each wind turbine unit over its operating time $OD_3$ may be determined from $X_{10}$, $X_3$, $X_4$, $X_5$, and $X_6$. In the exemplary embodiment, oil debris particle count $OD_1$ and oil debris rate-of-change $OD_2$ are calculated using:

$$OD_1(t) = X_{10}(t) \quad \text{Eq. (6)}$$
$$OD_2(t) = \frac{dOD_1(t)}{dt} = \frac{OD_1(t) - OD_2(t)}{\Delta t}$$

In the exemplary embodiment, calculating $OD_3$ and $OD_4$ requires calculating the Hotelling T-square statistic for $OD_1$ and $OD_2$ calculated for each wind turbine 202 over a period of time, and for multiple wind turbines 202 in the same wind farm across a similar operating period. In the exemplary embodiment, to calculate $OD_3$, the time series of multiple parameters, $OD_1$, $X_3$, $X_4$, $X_5$, $X_6$, $X_7$ and other X's or their principal components for the same wind turbine sampled over a period of time are used, shown in the form:

$$X = \begin{bmatrix} OD_1(t1) & X_3(t1) & X_4(t1) & X_5(t1) & X_6(t1) & X_7(t1) \\ OD_1(t2) & X_3(t2) & X_4(t2) & X_5(t2) & X_6(t2) & X_7(t2) \\ OD_1(t3) & X_3(t3) & X_4(t3) & X_5(t3) & X_6(t3) & X_7(t3) \\ \ldots & \ldots & \ldots & \ldots & \ldots & \ldots \\ \ldots & \ldots & \ldots & \ldots & \ldots & \ldots \\ OD_1(tn) & X_3(tn) & X_4(tn) & X_5(tn) & X_6(tn) & X_7(tn) \end{bmatrix} \quad \text{Eq. (7)}$$

for a "healthy" time period, i.e. a time period in which no anomalies were detected, and which usually occurs in an early stage of operation of wind turbine 202. In the exemplary embodiment, to determine this "healthy" dataset, a mean vector $\overline{X}$ using Eq. (8) and covariance matrices C using Equation (9) are calculated as follows:

$$\overline{X} = \left[ \frac{1}{n}\sum_{i=1}^{n} OD(t_i) \quad \frac{1}{n}\sum_{i=1}^{n} X_3(t_i) \quad \frac{1}{n}\sum_{i=1}^{n} X_4(t_i) \quad \frac{1}{n}\sum_{i=1}^{n} X_5(t_i) \quad \frac{1}{n}\sum_{i=1}^{n} X_6(t_i) \quad \frac{1}{n}\sum_{i=1}^{n} X_7(t_i) \right] \quad \text{Eq. (8)}$$

$$C = \begin{bmatrix} \text{Var}(OD_1) & \text{Cov}(OD_1, X3) & \text{Cov}(OD_1, X4) & \text{Cov}(OD_1, X5) & \text{Cov}(OD_1, X_6) & \text{Cov}(OD_1, X_7) \\ \text{Cov}(OD_1, X_3) & \text{Var}(X_3) & \text{Cov}(X_3, X_4) & \text{Cov}(X_3, X_5) & \text{Cov}(X_3, X_6) & \text{Cov}(X_3, X_7) \\ \text{Cov}(OD_1, X4) & \text{Cov}(X_3, X_4) & \text{Var}(X_4) & \text{Cov}(X_4, X_5) & \text{Cov}(X_4, X_6) & \text{Cov}(X_4, X_7) \\ \text{Cov}(OD_1, X_5) & \text{Cov}(X_3, X_5) & \text{Cov}(X_4, X_5) & \text{Var}(X_5) & \text{Cov}(X_5, X_6) & \text{Cov}(X_5, X_7) \\ \text{Cov}(OD_1, X_6) & \text{Cov}(X_3, X_6) & \text{Cov}(X_4, X_6) & \text{Cov}(X_5, X_6) & \text{Var}(X_6) & \text{Cov}(X_6, X_7) \\ \text{Cov}(OD_1, X7) & \text{Cov}(X_3, X7) & \text{Cov}(X_4, X_7) & \text{Cov}(X_5, X_7) & \text{Cov}(X_6, X_7) & \text{Var}(X_7) \end{bmatrix} \quad \text{Equation (9)}$$

where for example, Var($X_3$) is the variance of $X_3$ and Cov($X_3$, $X_4$) is the covariance of $X_3$ and $X_4$ calculated per standard statistical techniques. Moreover, in the exemplary embodiment, the Hotelling-Tsquare test statistic is calculated for use in future observations of the measurement set ($OD_1$, $X_3$, $X_4$, $X_5$, $X_6$, $X_7$), wherein the Hotelling-Tsquare test statistic is calculated using:

$$T^2 = (X_{n+1} - \overline{X})' \cdot C^{-1} \cdot (X_{n+1} - \overline{X}) \quad \text{Eq. (10)}$$

and upper and lower alarm threshold levels on $T^2$ values are established. Further, in the exemplary embodiment, an updated value of $T^2$ is calculated whenever a new measurement vector is obtained, and a sharp change in $T^2$ is used to alert a change in state, which could be a potential anomaly.

The above embodiments describe a multivariate detector used to compare a unit's behavior with itself. In an alternative embodiment, the oil debris feature, $OD_1$, is calculated for 'k' turbines in the wind farm, and that measurement time series takes the form:

$$X = \begin{bmatrix} OD_1^{(1)}(t1) & OD_1^{(2)}(t1) & \ldots & OD_1^{(k)}(t1) \\ OD_1^{(1)}(t2) & OD_1^{(2)}(t2) & \ldots & OD_1^{(k)}(t2) \\ \vdots & \vdots & \ddots & \vdots \\ OD_1^{(1)}(tn) & OD_1^{(2)}(t2) & \ldots & OD_1^{(k)}(t2) \end{bmatrix} \quad \text{Eq. (11)}$$

wherein the mean vector $\overline{X}$, the variance-covariance matrix C for the 'k' turbines and the associated Hotelling-Tsquare statistic $T^2$ are calculated using the same statistical approach previously described. It should be noted that the above embodiments for calculating a Hotelling-Tsquare value use a standard statistical technique that can also be applied as an anomaly detector for use with the oil debris data.

Figure 5:
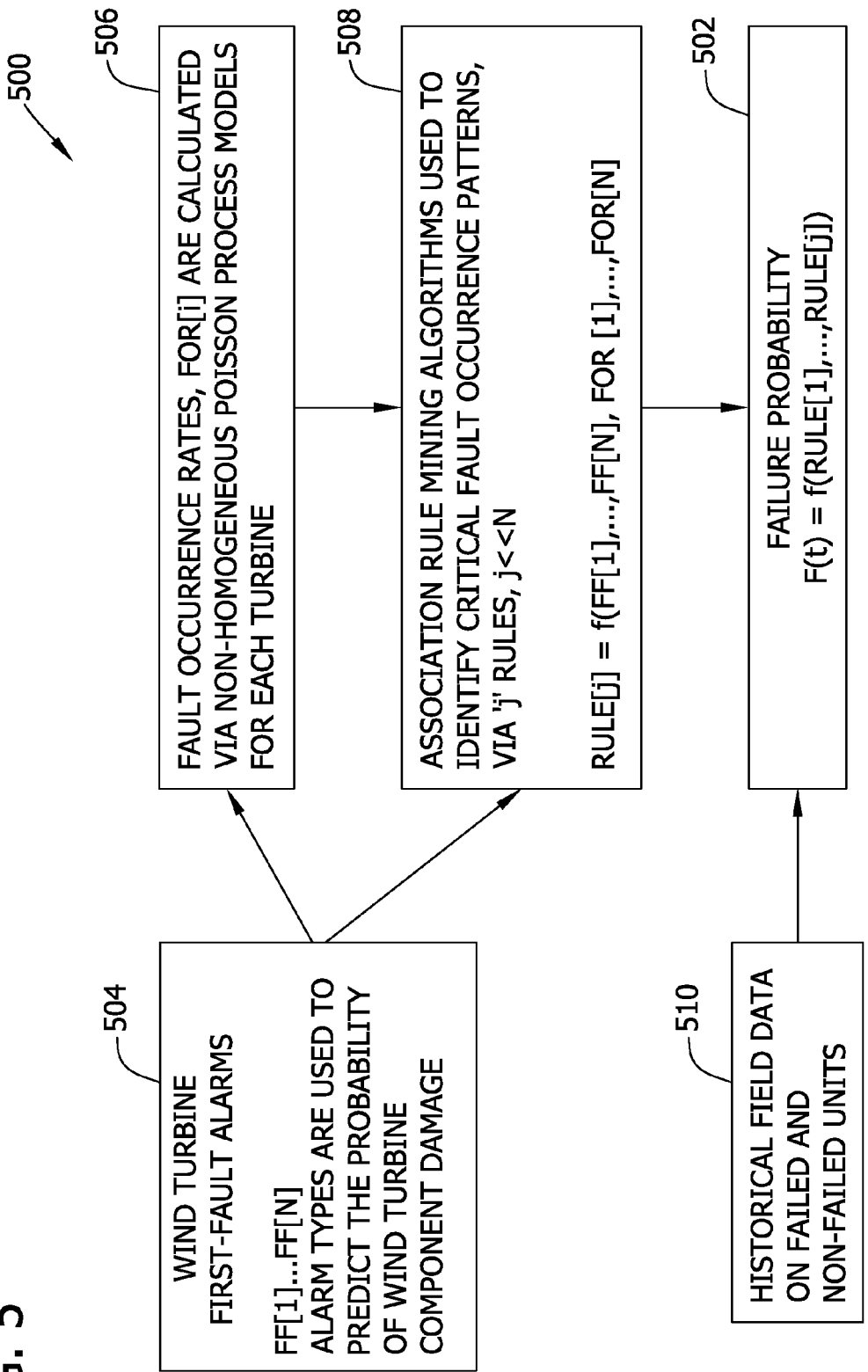
FIG. 5 is a block diagram illustrating an exemplary sub-system for calculating an event-based failure probability for use in determining an operational lifetime of a wind turbine generator.

FIG. 5 is a block diagram illustrating an exemplary subsystem 500 for calculating the event-based failure probability 502 for use by a controller, such as controller 204 shown in FIG. 2, to determine the operational lifetime of a wind turbine, such as wind turbine 100 shown in FIG. 1 or wind turbine 202 shown in FIG. 2. In an exemplary embodiment, at least one wind turbine first-fault alarm 504 is used by controller 204 to calculate at least one fault occurrence rate (FOR) 506 for each wind turbine 202. In the exemplary embodiment, wind turbine first-fault alarms 504 are provided by the manufacturer for each wind turbine 202 and are specific to each wind turbine 202. In one embodiment, FOR calculations may be calculated via non-homogenous Poisson process models for each wind turbine 202. In various embodiments, such Poisson process models for each wind turbine 202 may include models estimated from alarm data received from controller 204 by identifying alarms specific to a failure mode and determining a cumulative number of alarms versus time. In such embodiments, known processes are used to fit a Non-Homogenous Poisson process (NHPP) with Weibull intensity function to the received alarm data.

Moreover, in one embodiment, critical fault occurrence pattern rules 508 are identified using known associated rule mining (ARM) algorithms, which extract the rule as well as provide a numerical score of the support and confidence in that rule, which is specific to each pattern of alarms. In the exemplary embodiment, such pattern rules 508 are identified based on a combination of one or more first-fault alarms 504 and FOR calculations. In one embodiment, failure probability 502 is determined based on one or more of such identified pattern rules 508 and historical field data 510 on failed and non-failed units. In the exemplary embodiment, historical field data 510 may include patterns of first-fault alarms that historically have resulted in associated faults and failures of components of wind turbine 202. In one embodiment, historical data 510 may also include historical data 510 from predetermined interchangeable wind turbine generator components, such as interchangeable replacement generators of varying generating capacities and interchangeable replacement rotor blades of varying sizes. Such interchangeable components may exhibit similar fault and/or failure patterns as wind turbine 202 and incorporating these patterns into historical data 510 may improve accuracy of controller's 204 determination of an estimate of the time to failure of wind turbine 202. In one embodiment, controller 204 correlates first-fault alarms 504 against historical data 510 to determine if such first-fault alarms 504 have indicated a future fault or failure of one or more corresponding components of wind turbine 202. In one embodiment, first-fault alarms 504 are defined and provided by a manufacturer of wind turbine 202.

In an alternative embodiment, first-fault alarms 504 are defined and provided by other than the manufacturer of wind turbine. In yet another embodiment, first-fault alarms 504 are a known standard list of alarms 504.

Figure 6:
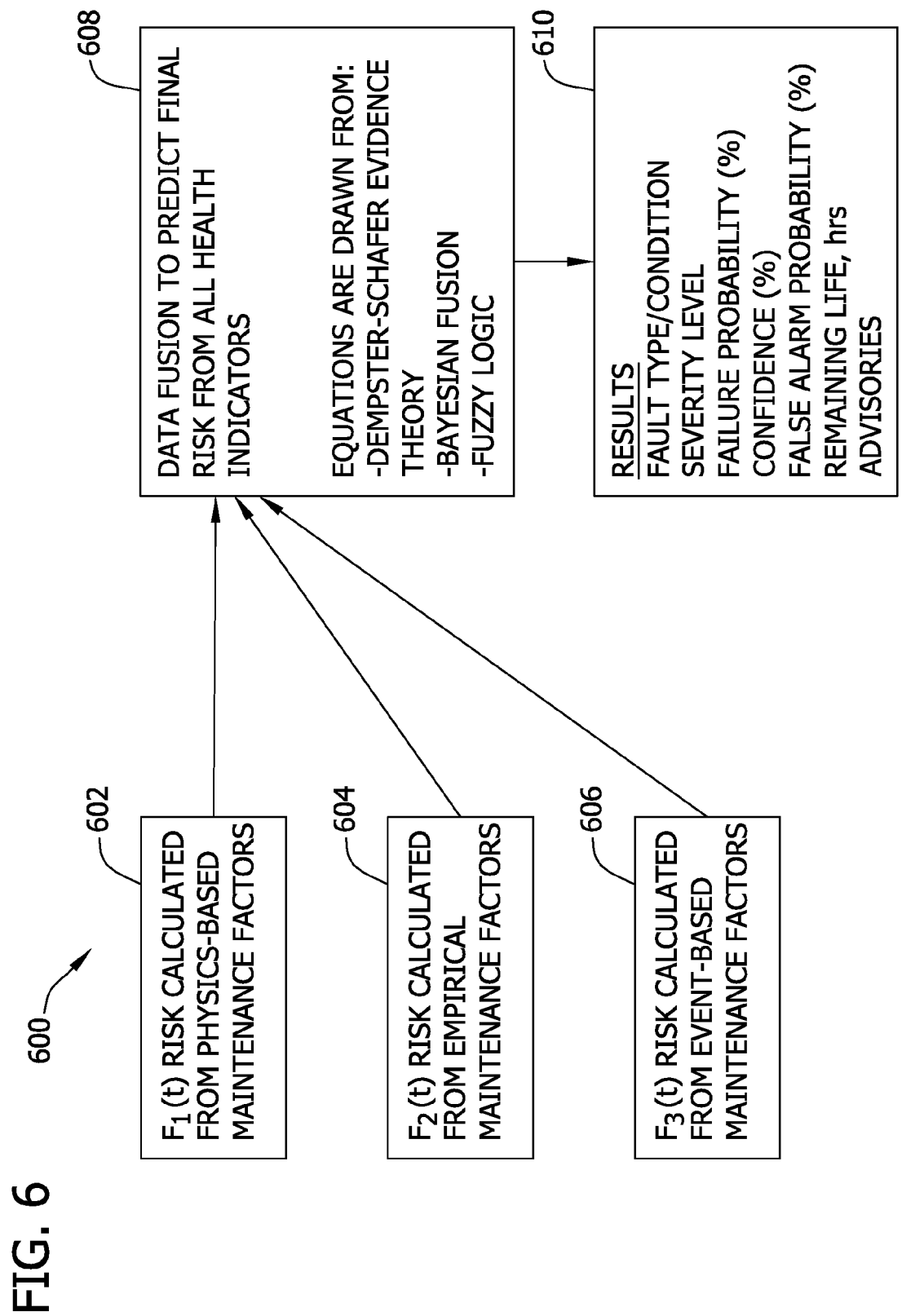
FIG. 6 is a block diagram illustrating an exemplary sub-system for determining an operational lifetime of a wind turbine by combining maintenance factors and failure probabilities described in previous figures.

FIG. 6 is a block diagram illustrating an exemplary subsystem 600 for determining the operational lifetime of a wind turbine, such as wind turbine 100 shown in FIG. 1 or wind turbine 202 shown in FIG. 2, based on one or more of a failure probability $F_1(t)$ calculated from physics-based maintenance factors 602, a failure probability $F_2(t)$ calculated from empirical maintenance factors 604, and a failure probability $F_3(t)$ calculated from event-based maintenance factors 606. In the exemplary embodiment, one or more known data fusion techniques 608 are used to calculate the operational lifetime of a wind turbine. In various embodiments, the one or more data fusion techniques 608 include: (a) a weighted average of failure probabilities where the weights could be calculated based on the uncertainty associated with each failure probability prediction; (b) a method for fusing probabilities using fuzzy logic membership functions; (c) fusing probabilities using Dempster-Schafer theory; and (d) Bayesian fusion. In the exemplary embodiment, the results 610 of the determination of the operational lifetime of wind turbine include a determination of one or more of a fault type or condition, a severity level, a failure probability, a confidence, a false alarm probability, a remaining life in hours, and one or more advisories.

FIG. 7 is a flowchart of an exemplary method 700 for managing an operational lifetime of a wind turbine, such as wind turbine 100 shown in FIG. 1 or wind turbine 202 shown in FIG. 2, using a controller, such as controller 204 shown in FIG. 2, communicatively coupled to the wind turbine 202. In the exemplary embodiment, the method 700 includes receiving 702 operational data 214 at the controller from the wind turbine. Operational data 214 may include a signal transmitted by a sensor 212 (shown in FIG. 2), wherein the signal corresponds to a measurement of an operating parameter of the wind turbine 202, such as temperature, stress, vibration, and/or electrical output. In one embodiment, operational data 214 may include a fault condition that corresponds to a signal that indicates a value outside of a predetermined range. In the exemplary embodiment, method 700 further includes transmitting 704 operational data 214 to a server sub-system, such as server sub-system 216 shown in FIG. 2, and transmitting 706 a request for historical data, such as historical data 222 shown in FIG. 2, to server sub-system 216 wherein the historical data 222 corresponds to wind turbine 202. In one embodiment, historical data 222 includes historical operational data that corresponds to wind turbine 202 and/or historical data 222 from predetermined interchangeable wind turbine generator components, such as interchangeable replacement generators of varying generating capacities and interchangeable replacement rotor blades of varying sizes. Such interchangeable components may exhibit similar fault and/or failure patterns as wind turbine 202 and incorporating these patterns into historical data 222 may improve accuracy of controller's 204 determination of an estimate of the time to failure of wind turbine 202. Further, in one embodiment, server sub-system 216 stores the received operational data 214. In a further embodiment, the stored operational data 214 may be used as historical data 222 in a response to subsequent requests.

Further, method 700 includes receiving 708 a response at the controller from the server sub-system, wherein the response includes the historical data 222 that corresponds to wind turbine 202. In certain embodiments, historical data 222 included in such a response may include any of the types of historical data 222 previously described. Furthermore, method 700 includes determining 710 an estimate of a time-to-failure of wind turbine 202. In the exemplary embodiment, the controller 204 uses the operational data 214 and/or historical data 222 to determine a time to repair, overhaul, inspect, or replace wind turbine 202 or components of wind turbine 202, based on the determined 710 estimate of the time to failure of wind turbine 202.

Exemplary embodiments of a wind turbine health management system and method for managing an operational lifetime of a wind turbine are described above in detail. The system, as described herein, may be used to manage wind turbines used to drive mechanical loads as opposed to generating electricity, and thus are not limited to practice with only the methods and systems as described herein. Rather, the exemplary embodiment can be implemented and utilized in connection with many wind turbine applications.

In the foregoing specification, it will be evidence that various modifications and change can be made thereto without departing from the broader spirit and scope of the invention. The specification and drawings are, accordingly, to be regarded in an illustrative rather than a restrictive sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A controller for use in managing an operational lifetime of at least one wind turbine, said controller communicatively coupled to the wind turbine and a server sub-system, said controller configured to:
   receive operational data from the wind turbine;
   transmit the operational data to the server sub-system;
   transmit a request for historical data corresponding to the wind turbine to the server sub-system;
   receive a response from the server sub-system, the response comprising historical data corresponding to the wind turbine; and
   determine an estimate of a time to failure of the wind turbine based on at least one of the operational data and the historical data.

2. A controller in accordance with claim 1, wherein the operational data comprises a signal transmitted by a sensor, the signal corresponding to a measurement by the sensor of at least one operating parameter of the wind turbine.

3. A controller in accordance with claim 2, wherein the operational data further comprises a fault condition corresponding to the signal transmitted by the sensor, the fault condition indicating a signal value outside of a predetermined range.

4. A controller in accordance with claim 1, wherein the historical data comprises historical operational data corresponding to at least one of the wind turbine and predetermined interchangeable wind turbine generator components.

5. A controller in accordance with claim 4, wherein the server sub-system stores the received operational data on a storage medium for use as historical data.

6. A controller in accordance with claim 1, wherein said controller is further configured to determine a time for at least one of a repair, an overhaul, an inspection, and a replacement of the wind turbine based on at least one of the estimated time to failure, the operational data, and the historical data.

7. A controller in accordance with claim 1, wherein said controller is coupled to at least one output device for use in outputting at least one of the estimated time to failure, the operational data, and the historical data.

8. A system for use in managing an operational lifetime of at least one wind turbine, said system comprising:
   a controller communicatively coupled to the at least one wind turbine via a communications interface, said controller configured to determine an estimate of a time to failure of the at least one wind turbine based on at least one of operational data and historical data corresponding to the at least one wind turbine; and
   a server sub-system communicatively coupled to said controller, wherein said server sub-system is configured to:
   receive the operational data from said controller corresponding to the at least one wind turbine;
   receive a request for the historical data corresponding to the at least one wind turbine from said controller; and
   transmit a response to said controller, the response comprising the historical data corresponding to the at least one wind turbine.

9. A system in accordance with claim 8, wherein the operational data includes a signal transmitted by a sensor, the signal corresponding to a measurement by the sensor of at least one operating parameter of the at least one wind turbine.

10. A system in accordance with claim 9, wherein the operational data includes a fault condition corresponding to the signal transmitted by the sensor, the fault condition indicating a signal value outside of a predetermined range.

11. A system in accordance with claim 8, wherein the historical data comprises historical operational data corresponding to at least one of the at least one the historical data comprises historical operational data corresponding to at least one of the wind turbine and predetermined interchangeable wind turbine generator components.

12. A system in accordance with claim 11, wherein said server sub-system stores the received operational data on a storage medium for use as historical data.

13. A system in accordance with claim 8, wherein said controller further determines a time for at least one of a repair, an overhaul, an inspection, and a replacement, of the wind turbine based on at least one of the estimated time to failure, the operational data, and the historical data.

14. A system in accordance with claim 8, wherein at least one of said controller and said server sub-system are coupled to at least one output device for use in outputting at least one of the estimated time to failure, the operational data, and the historical data.

15. A method for managing an operational lifetime of at least one wind turbine using a controller, wherein the controller is communicatively coupled to the wind turbine, said method comprising:
   receiving operational data at the controller from the wind turbine;
   transmitting the operational data by the controller to a server sub-system;
   transmitting a request for historical data by the controller corresponding to the wind turbine to the server sub-system;
   receiving a response at the controller from the server sub-system, the response comprising historical data corresponding to the wind turbine; and
   determining an estimate of a time to failure of the wind turbine by the controller based on at least one of the operational data and the historical data.

16. A method in accordance with claim 15, wherein the operational data includes a signal transmitted by a sensor, the signal corresponding to a measurement by the sensor of at least one operating parameter of the wind turbine.

17. A method in accordance with claim 16, wherein the operational data includes a fault condition corresponding to the signal transmitted by the sensor, the fault condition indicating a signal value outside of a predetermined range.

18. A method in accordance with claim 15, wherein the historical data comprises historical operational data corresponding to at least one of the wind turbine and predetermined interchangeable wind turbine generator components.

19. A method in accordance with claim 15, wherein transmitting the operational data to the server sub-system further comprises storing the operational data on the storage sub-system for use as historical data.

20. A method in accordance with claim 15, wherein the method further comprises determining a time for at least one of a repair, an overhaul, an inspection, and a replacement based on at least one of the estimated time to failure, the operational data, and the historical data.

* * * * *